(12) United States Patent
Schütz et al.

(10) Patent No.: US 6,846,011 B2
(45) Date of Patent: Jan. 25, 2005

(54) ASSEMBLY UNIT COMPRISING DETENT ELEMENTS

(75) Inventors: Dominik Schütz, Waldaschaff (DE); Frank Dietz, Ranstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/391,251

(22) Filed: Mar. 18, 2003

(65) Prior Publication Data

US 2003/0178825 A1 Sep. 25, 2003

(30) Foreign Application Priority Data

Mar. 20, 2002 (DE) .................................. 202 04 461 U

(51) Int. Cl.⁷ .............................................. B60R 21/16
(52) U.S. Cl. ................................................ 280/731
(58) Field of Search .................... 280/731, 728.1, 280/728.2

(56) References Cited

U.S. PATENT DOCUMENTS

| | | | |
|---|---|---|---|
| 5,149,127 A | | 9/1992 | Manabe et al. |
| 5,380,037 A | * | 1/1995 | Worrell et al. ............ 280/728.2 |
| 5,470,100 A | * | 11/1995 | Gordon .................... 280/728.2 |
| 5,593,178 A | * | 1/1997 | Shiga et al. ................. 280/731 |
| 6,149,183 A | | 11/2000 | Ford |
| 6,276,711 B1 | | 8/2001 | Kurz et al. |
| 6,325,408 B1 | * | 12/2001 | Ford ........................ 280/728.2 |
| 6,457,379 B1 | * | 10/2002 | Mirone ........................ 74/552 |
| 6,554,312 B2 | * | 4/2003 | Sakane et al. ........... 280/728.2 |
| 6,675,675 B1 | * | 1/2004 | Sauer et al. .................. 74/552 |

FOREIGN PATENT DOCUMENTS

| | | |
|---|---|---|
| EP | 0754602 A1 | 1/1997 |
| EP | 0755830 A1 | 1/1997 |
| EP | 0830990 A1 | 3/1998 |
| EP | 1138558 A2 | 10/2001 |
| EP | 1179457 A1 | 2/2002 |
| WO | WO 98/29283 | 7/1998 |

\* cited by examiner

*Primary Examiner*—Faye M. Fleming
(74) *Attorney, Agent, or Firm*—Tarolli, Sundheim, Covell & Tummino L.L.P.

(57) ABSTRACT

An assembly unit has a first component with at least one first detent element and a second component with at least one second detent element. The first and second components are movable with respect to each other such that the first and second detent elements can form a detent connection. The assembly unit is able to assume a not correctly locked state in which the first and second detent elements are in immediate vicinity of each other, but have not yet formed a detent connection, and a correctly locked state in which the first and second detent elements have formed a detent connection. A checking device is provided so as to be integrated into the assembly. The checking device, the first and second components and the first and second detent elements are constructed and coordinated with each other such that the checking device is not removable from the assembly unit when the assembly unit is in the not correctly locked state, and the checking device is removable from the assembly unit when the assembly unit is in the correctly locked state.

11 Claims, 3 Drawing Sheets

ASSEMBLY UNIT COMPRISING DETENT ELEMENTS

TECHNICAL FIELD

The invention relates to an assembly unit including a first component with at least a first detent element and a second component with at least a second detent element. More particularly, the invention relates to an assembly unit comprising a vehicle steering wheel and a gas bag module attached thereto.

BACKGROUND OF THE INVENTION

Such first and second components may, as stated above, be, for instance, a vehicle steering wheel and a gas bag module which are to be fastened to each other by means of such detent elements. The first and second components are movable with respect to each other such that the first and second detent elements can form a detent connection. However, the assembly unit might assume a not correctly locked state in which the first and second detent elements are in immediate vicinity of each other, but have not yet formed a detent connection, and assume a correctly locked state in which the first and second detent elements have formed a detent connection.

Through detent connections, the components concerned are able to be connected with each other simply and quickly. However, it can not always be seen without difficulty whether a correctly locked detent connection has been made.

Detent connections are known which press the components apart again when a detent connection has not been made, so that a visual check is possible. These detent connections, however, are costly to manufacture. In addition, a visual check is not always possible in detent connections at points which are poorly visible. Many detent connections produce a noise at the moment of engagement, which can be used for an acoustic check. Owing to the noise level for example in a workshop, such an acoustic indication is, however, often only able to be noticed with difficulty.

It is an object of the invention to provide a possibility to be able to reliably proof that a correctly locked detent connection has been established.

BRIEF SUMMARY OF THE INVENTION

According to the invention, an assembly unit has a first component with at least one first detent element and a second component with at least one second detent element. A checking device is provided so as to be integrated into the assembly. The first and second components are movable with respect to each other such that the first and second detent elements can form a detent connection. The assembly unit is able to assume a not correctly locked state in which the first and second detent elements are in immediate vicinity of each other, but have not yet formed a detent connection, and a correctly locked state in which the first and second detent elements have formed a detent connection. The checking device, the first and second components and the first and second detent elements are constructed and coordinated with each other such that the checking device is not removable from the assembly unit when the assembly unit is in the not correctly locked state, and the checking device is removable from the assembly unit when the assembly unit is in the correctly locked state. The invention permits a reliable checking of a correctly locked detent connection, by the checking device only being able to be removed when the detent connection has actually been correctly made. In the critical, not correctly locked state, in which a visual differentiation from the correctly locked state is only possible with difficulty, because the detent elements are already very close and generally are already touching each other, i.e. are immediately before the correctly locked state, the checking device is blocked, so that it can not be removed from the assembly. According to the invention, a check can be made as to whether a correct detent connection has been made, by attempting to remove the checking device. This is only possible when the assembly unit is in the correctly locked state. The checking device is of one or more separate parts which may only temporarily be attached to the detent elements.

A further advantage of the assembly unit according to the invention lies in that it can proof evidence for a quality control which has taken place. Through the removed checking device, which may for example have a coding through which an allocation to a particular assembly unit is possible, the evidence is then provided that a correctly produced assembly unit was supplied.

Preferably, the assembly unit and the checking device are designed such that the checking device in the locked state of the assembly unit is able to be removed from the assembly unit without destruction. In this way, no parts of the checking device remain in the finished assembly.

Preferably, the checking device in an unlocked state, in which the detent elements are not yet touching each other, and also in the not correctly locked state, is fastened to one of the two components and is only released from this component by removal in the correctly locked state.

Advantageously, the checking device is designed in a bright color so that the access time is kept short and it is ensured that no checking device is overlooked.

In a preferred embodiment of the invention, the checking device is a band. The band is preferably fastened to one of the components such that at one point it projects outwards from the assembly, so that it can be withdrawn from the assembly unit on checking it.

In a further development of the invention, the checking device has a recess, for example an opening, into which a section of one of the detent elements engages in the not correctly locked state. The band is therefore blocked against removal, as long as the detent connection is not correctly locked.

In another embodiment of the invention, the checking device is realized as a pin which for example is only released by one of the detent elements when the detent connection is correctly locked.

The checking device can of course also be realized in another suitable manner. Alternatively, it can also be clamped in the assembly unit or on one of the components, or additionally fastened at particular points on the assembly or on one of the components, for example, by gluing. In order to convert the principle according to the invention, which is shown here, other methods of blocking and release of the checking device are also conceivable.

In case the assembly unit has several pairs of detent elements, advantageously a separate checking device is associated with each pair. Thus, in a simple manner the correct latching of each of the necessary detent connections can be checked. The invention is in fact particularly useful in this instance, because with several detent connections on one assembly, a correctly locked detent connection often makes it difficult to detect other not correctly locked detent connections.

In a preferred embodiment of the invention, one of the components is a steering wheel and the other component is a gas bag module. Here, in turn, it is preferred that one of the detent devices is a detent hook and the other detent device is a spring. On insertion of a gas bag module into a steering wheel, for safety reasons it is particularly important that the detent connection is correctly locked. Owing to the invention, simply constructed, robust and secure detent mechanisms can be used, because the checking of the correctly made detent connection is performed by the checking device.

Preferably, the checking device is secured so as to be fixed in position on one of the components in a state in which the detent elements are not yet in contact with each other, and on contact between and displacement of the detent elements towards the correctly locked state, one of the detent elements engages the checking device and releases it again on reaching the correctly locked state. Thus, in a simple manner, it can be achieved that the checking device can only be removed when the detent connection is correctly locked.

Preferably, the detent element engages the checking device in a form-fitting manner.

In the state in which the detent elements are not yet in contact with each other, the checking device can advantageously be fastened to the associated component by gluing.

DETAILED DESCRIPTION OF THE PREFERRED EMBODIMENT

Figure 1:
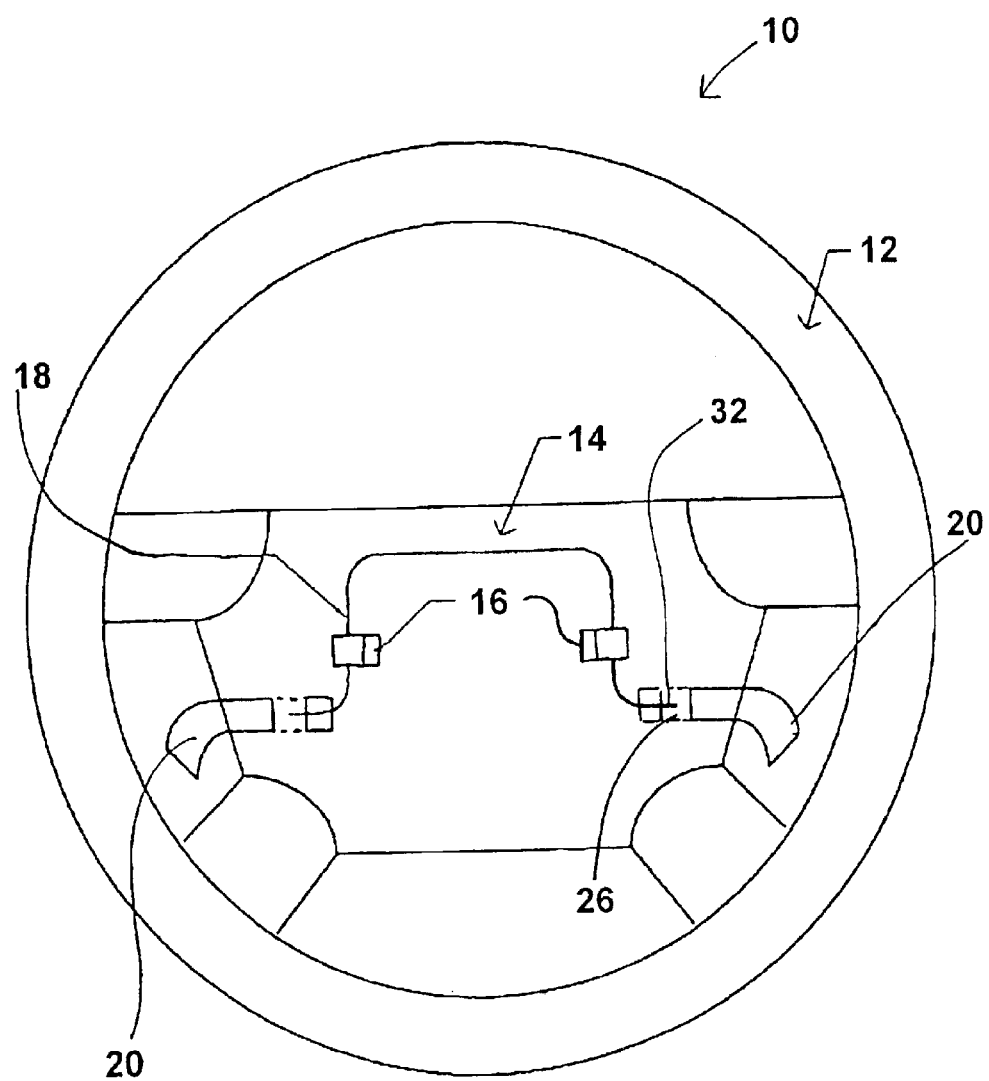
FIG. 1 shows a diagrammatic top view onto a steering wheel with a gas bag module as example of an assembly unit according to the invention.

FIG. 1 shows an assembly unit 10 of a first component which in this case is formed by a steering wheel 12, and of a second component, in this case a gas bag module 14. The steering wheel 12 has a first detent element connected therewith, which in the example shown here is a detent hook 16 connected in one piece with the steering wheel. The gas bag module 14 has a second detent element, which in the example shown here is constructed as a leg spring 18.

As a whole, the steering wheel 12 and the gas bag module 14 can form two detent connections in the example shown here. For this, two detent hooks 16 are constructed on the steering wheel 12, which can each engage in a known manner behind a section of the leg spring 18. For this, the leg spring 18 has a specific clearance of motion.

In the assembly unit 10, for each of the detent hooks 16 a checking device is arranged, which in this example consists of a flexible band 20. The band 20 is arranged such that its one end 22 projects from the assembly, whereas its second end 24 is arranged inside the assembly unit (see FIGS. 2 and 3). In the vicinity of the second end 24, the band 20 has an opening 26.

Figure 2:
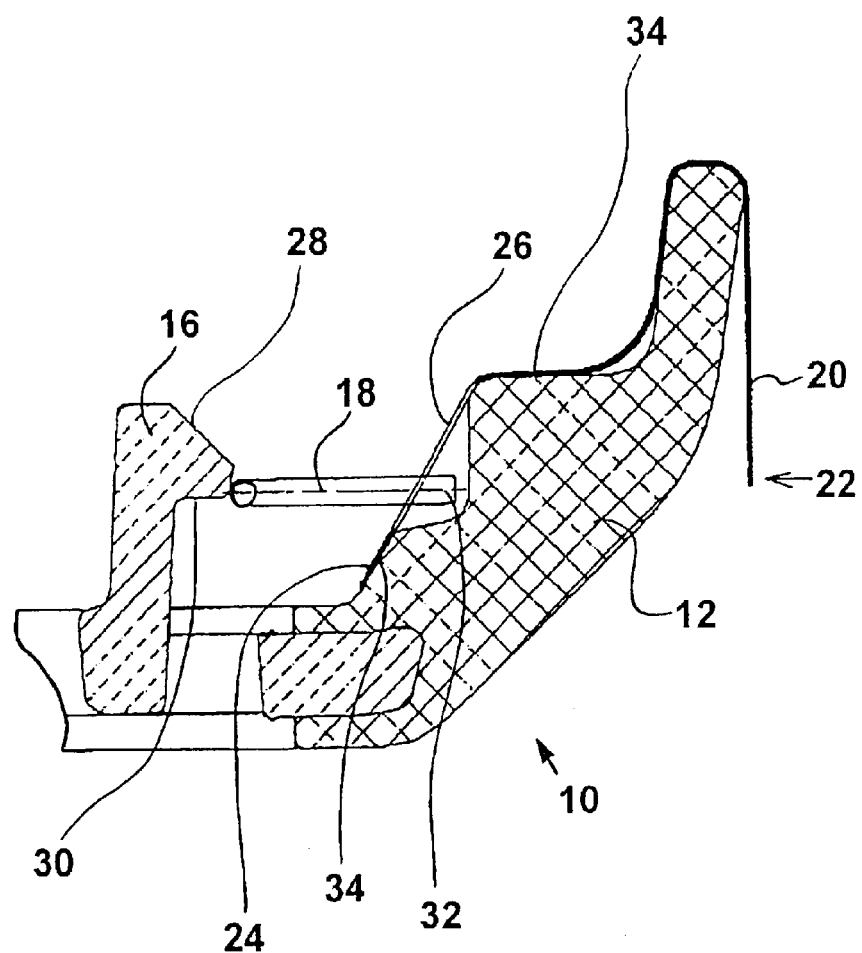
FIG. 2 shows a diagrammatic section through the assembly unit of FIG. 1 in the not correctly locked state.

FIG. 2 shows the assembly unit 10 in a not correctly locked state. The detent hook 16 and the leg spring 18 are in the immediate vicinity of each other and are already touching each other. The leg spring 18 has slid along the ride-up bevel 28 of the detent hook 16, so that it is already deflected by the detent hook 16, but has not yet come to lie against the detent face 30 of the detent hook 16, so that the detent connection has not yet been produced.

In the position assumed in the not correctly locked state, one end 32 of the leg spring 18 projects into the opening 26 of the band 20. This prevents the band 20 from being withdrawn by pulling the end 22, so that the band 20 can not be removed from the assembly unit 10.

In the example shown here, the band 20 is connected at suitable points 34 with the steering wheel 12, for example by it being received in a mounting, which can be released with a small amount of force, in a foam contour of the steering wheel, or by adhesion. The fastening at the points 34 serves merely to hold the band 20 in its desired position, before withdrawal.

Figure 3:
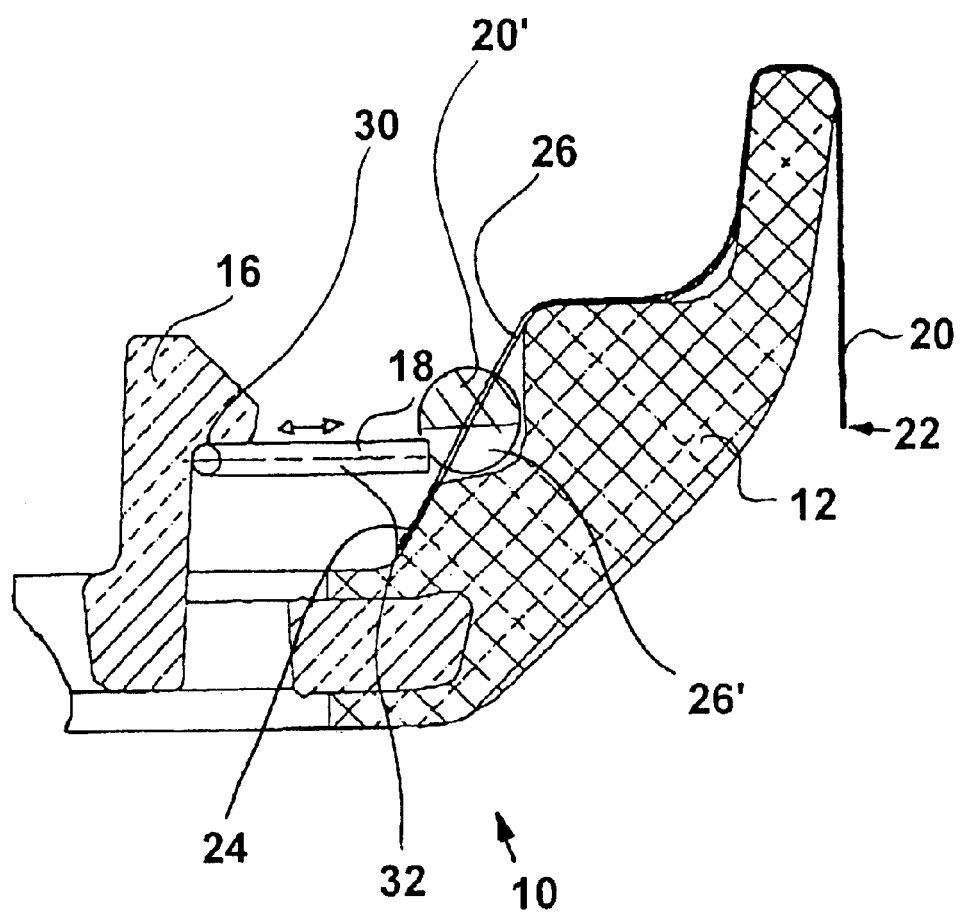
FIG. 3 shows a diagrammatic section through the assembly unit of FIG. 1 in the correctly locked state.

FIG. 3 shows the assembly unit 10 in the correctly locked state. Now, the leg spring 18 lies against the detent face 30 of the detent hook 16. In this position, the end 32 of the leg spring 18 exposes the opening 26 of the band 20, so that the latter can be removed from the assembly unit 10, without destruction, by traction at the end 22.

Through the invention, it is firstly ensured that a correct locking of the detent connection has taken place between the first and the second component. At the same time, evidence is also provided through the invention that this detent connection has been correctly made, because each undamaged checking device, removed from the assembly, represents a correct detent connection between two detent elements.

If, as shown in FIG. 1, several detent connections are provided in the assembly, it is sensible to associate a separate checking device with each of these detent connections; however, it is also conceivable to only provide a single checking device.

The example embodiment which is described is intended merely to illustrate the principle of the invention. The locking and release of the checking device may also take place in a different way from the one described. The checking device may, for example, also be constructed as a pin 20' FIG. 3, which may, for example, have a recess 26' on its underside, and is freed when the assembly unit is in the correctly locked state. The checking device could, for example, also not be locked by the detent element itself, but by a further component, a locking by clamping also being conceivable.

What is claimed is:

1. An assembly unit including a first component with at least one first detent element and a second component with at least one second detent element, and a checking device integrated into said assembly,
    said first and second components being movable with respect to each other such that said first and second detent elements can form a detent connection,
    said assembly unit being able to assume a not correctly locked state in which said first and second detent elements are in immediate vicinity of each other, but have not yet formed a detent connection, and a correctly locked state in which said first and second detent elements have formed a detent connection,
    said checking device, said first and second components and said first and second detent elements being constructed and coordinated with each other such that said checking device is not removable from said assembly unit when said assembly unit is in said not correctly locked state, and said checking device is removable from said assembly unit when said assembly unit is in said correctly locked state.

2. The assembly unit according to claim 1, wherein said checking device, in an unlocked state in which said two components are not touching each other, is fastened to one of said first and second components.

3. The assembly unit according to claim 1, wherein said checking device is a band.

4. The assembly unit according to claim 1, wherein said checking device is a pin.

5. The assembly unit according to claim 1, wherein said checking device has a recess, into which a section of one of said detent elements engages in said not correctly locked state.

6. The assembly unit according to claim 1, wherein a plurality of checking devices is provided and wherein said assembly unit has several pairs of detent elements and one checking device is associated with each of said pairs.

7. The assembly unit according to claim 1, wherein one of said components is a vehicle steering wheel and the other component is a gas bag module.

8. The assembly unit according to claim 1, wherein one of said detent elements is a detent hook and the other detent element is a spring.

9. The assembly unit according to claim 1, wherein said checking device is secured in position on one of said first and second components in a state in which said detent elements are not yet in contact with each other, and wherein upon a contact between and displacement of said detent elements towards said correctly locked state, one of said detent elements engages said checking device and releases it again on reaching said correctly locked state.

10. The assembly unit according to claim 9, wherein said detent element engages said checking device in a form-fitting manner.

11. The assembly unit according to claim 9, wherein said checking device is fastened to its associated component by gluing, in said state in which said detent elements are not yet in contact with each other.

\* \* \* \* \*